United States Patent [19]

Shepard

[11] 4,174,576
[45] Nov. 20, 1979

[54] ADJUSTABLE PROFILE FINGER SETTING JIG

[75] Inventor: Michael L. Shepard, Covington, Va.

[73] Assignee: Westvaco Corporation, New York, N.Y.

[21] Appl. No.: 919,762

[22] Filed: Jun. 28, 1978

[51] Int. Cl.² .............................................. G01B 5/14
[52] U.S. Cl. ................................................ 33/181 R
[58] Field of Search ................... 33/181, 180 R, 185 R

[56] References Cited

U.S. PATENT DOCUMENTS 3,608,886  9/1971  Greene ............................... 33/180 R Primary Examiner—Willis Little
Attorney, Agent, or Firm—W. Allen Marcontell; Ernest B. Lipscomb, III

[57] ABSTRACT

A corrugating machine finger setting jig is disclosed having an adjustable profile surface to simulate the arcuate profile of a cooperative corrugating roll.

3 Claims, 3 Drawing Figures

ADJUSTABLE PROFILE FINGER SETTING JIG

BACKGROUND OF THE INVENTION

1. Field of the Invention

The present invention relates to methods and apparatus for continuously fabricating corrugated board from web materials. More particularly, the present invention relates to a jig for accurately setting stripper fingers and the like on web corrugating machines.

2. Description of the Prior Art

By the prior art technique of fabricating corrugated board from webs of paper, as illustrated by FIG. 1 of the Drawing, a continuous web W is delivered into the meshing nip 50 between two corrugating rolls 51 and 52. The periphery of these corrugating rolls comprises an undulating surface of longitudinally extended flutes. Such flutes mesh together as gears when the rolls are rotatively driven.

Upon emergence from the meshing nip, the undulated web which is to form the sinusoidal medium between two face laminae of finished, double-face board, is held tightly against one of the corrugating rolls for approximately 180° of roll arc into a second nip 54 with a smooth surface roll 53 which presses a flat web of first liner sheet L into adhesive contact with the flute tips of the undulating medium. To positively control the medium course from the corrugating nip to the liner nip, a multiplicity of crescent shaped fingers 20 are provided. These fingers project into the corrugating roll nip 50 within circumferential slots cut across the fluted surface of one such roll 51. The projected nip point 22 of such fingers strips the emerging web from the surface of said one corrugating roll and provide, by the arcuate internal edge 21 of each finger, a channel to confine the corrugated medium against the undulated surface of the other corrugating roll 52.

To perform the stripping and guiding function properly, the said fingers must be rigidly secured on a finger mounting bar 55 in a position spaced from the cooperative corrugating roll flute tips at a distance equal to the thickness of the medium web plus approximately 0.001 to 0.002 inch. Normally, this spacing adds to about 0.010 inch, total. Moreover, such clearance must be uniform over the full arcuate length of the finger.

Such close tolerance positionment of the fingers creates operational difficulty when it is further considered that there are approximately 30 fingers on a machine of normal, 87 inch width web capacity equally spaced on 3 inch centers. Furthermore, such fingers are fabricated of brass and are easily and frequently distorted by disturbances in the medium flow. These circumstances, therefore, are the source of considerable, non-productive downtime.

In the past, to expedite the finger setting task, such fingers were secured by cooperative holders 30 on a jig having a cross-sectional or wafer portion of the subject corrugation roll secured to a jig frame. Such a jig has mounting holes by which the finger holder is secured to the jig frame in exactly the same position relative to the corrugating roll axis as the finger-holder unit assembly would have on the subject machine. This technique permits the fingers to be relatively quickly and conveniently combined with a respective holder in the exact location relative to the roll that the unit would have on the subject machine. When removed from the jig and secured to the finger mounting bar on the subject machine, the precise finger position has already been determined.

So long as the original roll wafer accurately represents the size and configuration of the cooperative corrugating roll, the aforedescribed jig setting technique performs quite well. However, if the roll is subsequently re-machined due to wear and scratches in the fluted surface thereof, the said prior art jig is rendered useless due to lack of correspondence between the jib wafer and the actual roll. Consequently, either another jig wafer must be made to accurately copy the new roll profile or all fingers must be repetitively set in place to the required clearance on the actual machine.

It is therefore, an object of the present invention to teach the construction of a novel finger setting jig having radially adjustable reference surfaces whereby the exact profile of any roll may be simulated as a reference surface for securing a finger-holder unit in the required relationship which provides the required clearance space when secured to the finger mounting bar.

SUMMARY OF THE INVENTION

The jig of the present invention is provided with a plurality of eccentric circle cam surfaces dispersed over an arc roughly approximating that of the subject machine roll spanned by such fingers.

The spatial profile of the subject machine is gauged by adjusting one finger-holder unit on the actual machine and subsequently removing the set unit from the machine to be mounted on the jig. With the set finger-holder unit in place, the several cams are turned into contact with the inside edge of the finger element and secured. The jig is now ready for assembly of subsequent finger-holder units.

BRIEF DESCRIPTION OF THE DRAWING

Relative to the drawing wherein like reference characters designate like or similar elements throughout the several figures of the drawing.

DESCRIPTION OF THE PREFERRED EMBODIMENT

Figure 1:
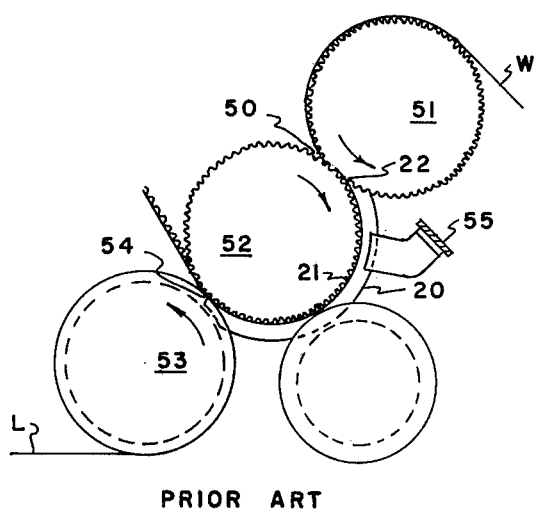
FIG. 1 illustrates the corrugating nip section of a representative prior art corrugating machine.
Figure 3:
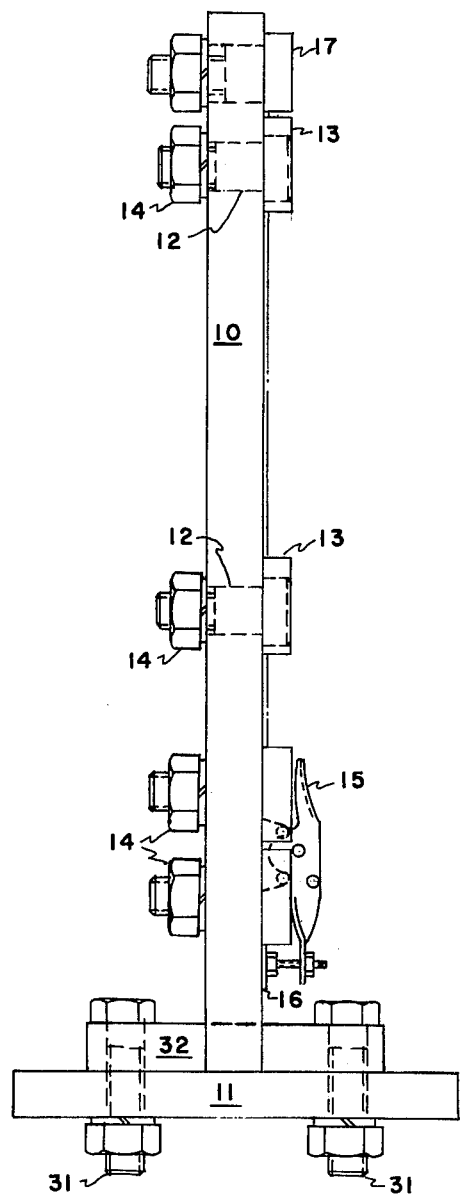
FIG. 3 illustrates an end view of the present finger setting jig.
Figure 2:
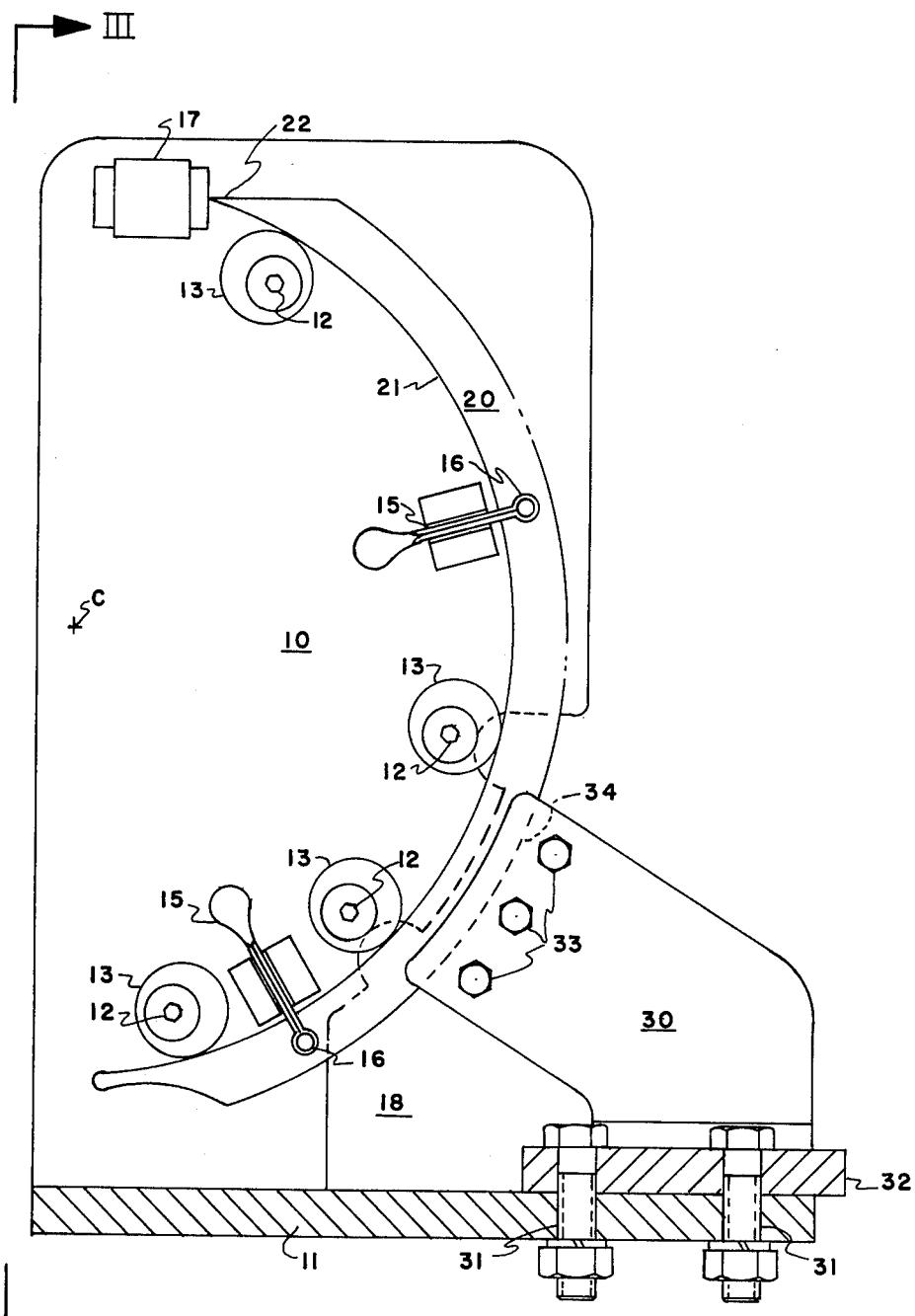
FIG. 2 illustrates a side view of the present finger setting jig.

The apparatus of the present invention comprises a jig frame having a side plate 10 and base plate 11. The flat planes of the two plates are mutually perpendicular.

Within the plane of the side plate 10, the location of a center point C is determined from the radius of the corrugating roll to which the assembled finger 20 and holder 30 are to be fitted. Also relative to the center point C and the finger-holder assembly are provided a set of holder bolt holes 31 in the base plate 11. These bolt holes 31 are positioned in space from the center point C at the same distance and angular orientation as is found between the corrugating roll axis and holder mounting holes in the mounting bar (not shown) on the machine to which the present jig relates.

On the side plate are provided a number of eccentric cams 13 dispersed over an arc about the center point C. Such cams 13 may be fabricated as eccentric sleeves pressed over the head of shoulder screws 12 having a threaded shank passing through the side plate 10 thickness. The cam assembly is positionally secured by nuts 14.

Also disposed over an arc about the center point C at a radius corresponding to the approximate mounting position of a finger 20 on the subject machine are at least a pair of toggle clamps 15 having pressure pads 16.

Additionally, side plate 10 is provided with a recess region 18 as clearance space for a holder 30 when mounted to the base plate 11.

On the opposite end of the side plate 10 from the base plate 11 is provided an adjustable abutment 17 disposed within the arc of a finger 20 when positioned against the cams 13.

To use the aforedescribed apparatus, a finger 20 and holder 30 assembly is set relative to the corrugating machine of actual use. This is to say that the holder base 32 is secured to the machine mounting bar (not shown) with bolts 31. With the finger holder secured, the position of finger 20 is manipulated relative to the machine corrugating roll (not shown) until the desired uniform spacing of the finger inner edge 21 from the roll flutes is found. This usually is about 0.010 inch. At this position, the finger clamping screws are tightened to secure the set relationship between the corrugating roll, the finger 20, the holder 30 and the mounting bar.

Without disturbing the finger 20-holder 30 relationship, the unit is removed from the subject machine by disassembly of the bolts 31. Such unit assembly is then secured to the present jig base 11. Next, the abutment 17 is adjusted against the finger tip to fix the angular position of the finger 20 within the arc about center point C.

Cams 13 are then rotated into contact with the finger inner edge 21 and rigidly clamped to that position by nuts 14.

The present jig is now set for assembly of all remaining finger-holder units on the subject machine. This process simply entails positionment of a finger 20 inner edge 21 against the rigidly held cams 13. Forthwith, the toggle clamps 15 are pressed to engage pressure pads 16 for temporarily securing the finger 20 in the correct position relative to the cams 13 and abutment 17. In this condition, a holder 30 is positioned with the finger slot 34 about the finger 20 and the base 32 aligned to receive mounting bolts 31. In this position, slot clamping screws 33 are tightened to secure the finger-holder unit.

As with the first unit, mounting bolts 31 are thereafter removed and the toggle clamps 15 released to permit undisturbed removal of the unit from the jig. This unit is ready for final mounting on the subject machine without the necessity for final clearance adjustment.

The procedure is repeated for all remaining finger-holder units required by the machine.

Having fully described my invention, obvious alternatives will readily appear to those of ordinary skill in the art. As my invention,

I claim:

1. An assembly jig for corrugating machine finger-holder units comprising:
   A. a side plate and a base plate integrally joined in mutually perpendicular planes;
   B. a reference axis disposed perpendicularly to said side plate;
   C. holder mounting means on said base plate to locate and secure a finger holder in substantially the same spacial position relative to said reference axis as said holder would occupy when mounted on a subject corrugating machine;
   D. first adjustable surface means secured to said side plate at a radial distance from said reference axis approximately the same as a radius of a subject corrugating roll for locating one arcuate end of a stripper finger in substantially the same spacial position relative to said reference axis and holder mounting means as said one arcuate end would occupy on said subject corrugating machine;
   E. a plurality of second adjustable surface means secured to said side plate in an arcuate distribution relative to said reference axis for locating intermediate arcuate surface points on said stripper finger in substantially the same spacial positions relative to said reference axis and holder means as said intermediate points would occupy on said subject corrugating machine; and
   F. clamping means to temporarily secure said stripper finger to said side plate in simultaneous contact position with said adjustable surface means.

2. Apparatus as described by claim 1 wherein said second adjustable surface means comprises eccentric circle cam means.

3. A method of presetting the positional relationship between a corrugating machine stripper finger and a holder therefor, said method comprising the steps of:
   A. securing a combined finger and holder unit to a subject corrugating machine finger mounting bar;
   B. adjusting the set relationship between said finger and said holder to a predetermined clearance between said finger and a corrugating roll of said machine to form a pattern unit;
   C. without disturbing said set relationship, removing said pattern unit from said mounting bar and securing same to a jig mount;
   D. setting a first adjustable surface of said jig mount to point contact with one arcuate end of said jig mounted pattern unit;
   E. setting a plurality of second adjustable surfaces of said jig mount to respective points of contact with an inside arcuate edge of said pattern unit finger;
   F. removing said pattern unit from said jig mount and substituting an unset finger and holder unit therefor;
   G. adjusting said unset finger to simultaneous point contact with said first and second adjustable surfaces;
   H. securing the set relationship between said unset finger and holder to form a preset finger and holder unit; and
   I. without disturbing said set relationship, removing said preset unit from said jig mount and securing same to said subject corrugating machine finger mounting bar.

* * * * *